Aug. 12, 1969 C. L. MOULTON 3,461,305

SYSTEM FOR CONTROLLING THE RESPONSE OF A PHOTOELECTRIC TAPE READER BY UTILIZING AN "OR" GATE AND A DELAY TO SIMULATE SPROCKET HOLE SIGNALS

Filed Feb. 13, 1967 2 Sheets-Sheet 1

INVENTOR.
Charles L. Moulton
BY
[signature]
ATTORNEY.

Aug. 12, 1969 C. L. MOULTON 3,461,305
SYSTEM FOR CONTROLLING THE RESPONSE OF A PHOTOELECTRIC TAPE READER BY UTILIZING AN "OR" GATE AND A DELAY TO SIMULATE SPROCKET HOLE SIGNALS
Filed Feb. 13, 1967 2 Sheets-Sheet 2
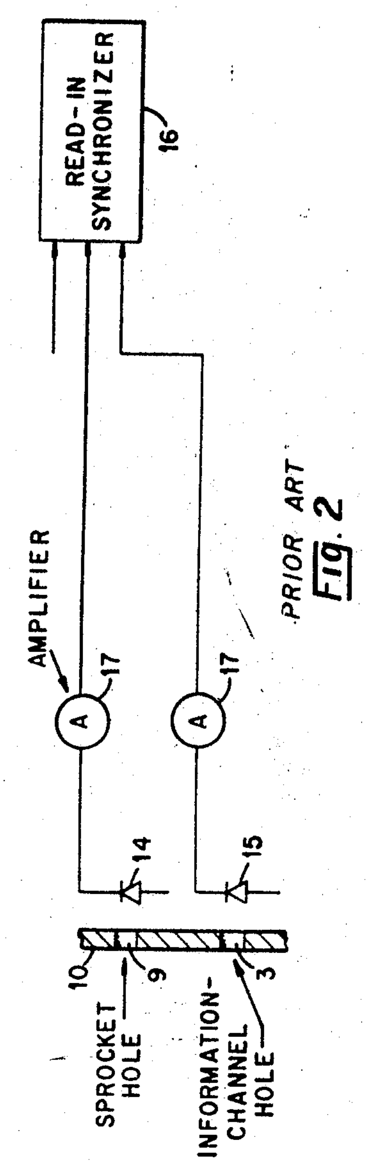
PRIOR ART FIG. 2
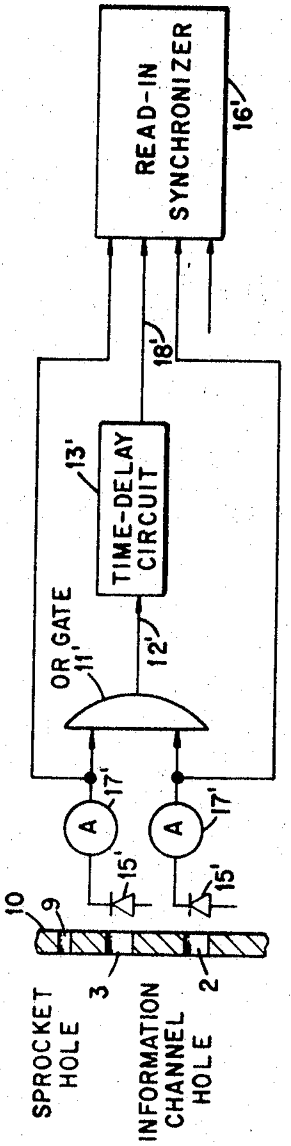
FIG. 3
INVENTOR
Charles L. Moulton
BY
[signature]
ATTORNEY.

United States Patent Office 3,461,305

Patented Aug. 12, 1969

3,461,305

SYSTEM FOR CONTROLLING THE RESPONSE OF A PHOTOELECTRIC TAPE READER BY UTILIZING AN "OR" GATE AND A DELAY TO SIMULATE SPROCKET HOLE SIGNALS

Charles L. Moulton, Knoxville, Tenn., assignor to the United States of America as represented by the United States Atomic Energy Commission Filed Feb. 13, 1967, Ser. No. 616,436

Int. Cl. G01n *21/30*

U.S. Cl. 250—219 1 Claim

ABSTRACT OF THE DISCLOSURE

The subject matter relates to systems for controlling the response of data recording circuits in a photoelectric tape reader wherein false operation or failure may occur by reason of misalignment or the disparity in sizes of punched holes in a tape that are employed to initiate activation of data recording circuits. Correction is achieved by employing plural sensing circuits aligned with different rows of punched holes so that the first to receive a light signal through one of the punched holes will, after a predetermined delay, initiate activation of the data recording circuits.

Summary of the invention

Figure 1:
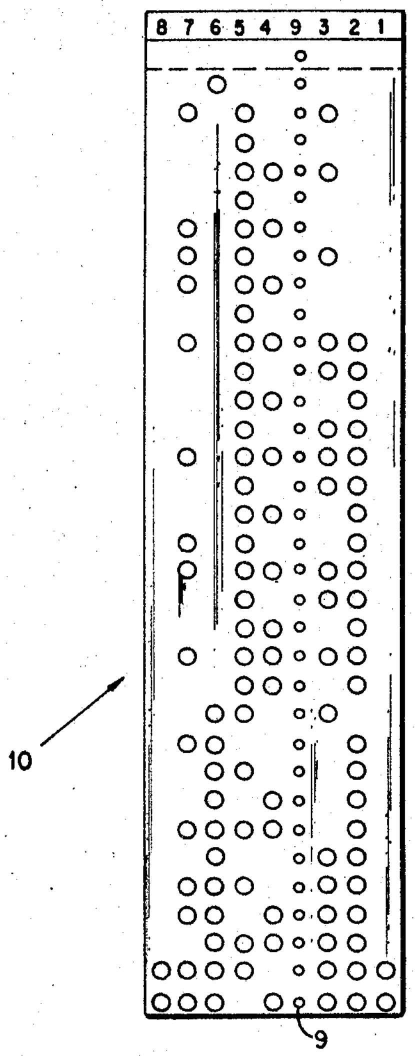
Fig. 1 PRIOR ART

The invention relates to the use of plural sensing circuits aligned with separate rows of holes punched in a tape, and is responsive to light passing through the first one of said holes when the tape is being scanned, to activate data recording circuits to process data from said tape.

The invention described herein was made in the course of, or under, a contract with the United States Atomic Energy Commission.

In the drawings, FIG. 1 is a plan view of a typical punched tape. FIG. 2 is a schematic of a part of a prior art tape reading system for activating the recording circuits of a system for processing data. FIG. 3 is a schematic of my improved tape reading control system for activating the recording circuits of a system for processing data.

In the typical numerical control system for a machine tool, an inspection head, or the like, and a bidirectional punched tape provide the machine control unit with the information required for automatic operation. The tape 10 of FIG. 1 is provided with a longitudinally extending series of holes 9 for a drive sprocket and with sets of longitudinally extending "information channels" 1, 2, 3, 4, 5, 6, 7, and 8. The channels are punched to convey various kinds of information required for machine control. As shown, the holes of sets 1, 2, 3, 4, 5, 6, 7, and 8 in the tape are punched to be in lateral alignment with the sprocket holes 9; each lateral row of punched and unpunched portions of a tape is termed a "line of information." Much of the information carried by the channels is in binary form, with a punched hole representing the number "one" and an unpunched space representing "zero." As indicated, the sprocket holes are small compared with the information-channel holes.

Referring to FIG. 2, in the typical numerical control system, the punched tape 10 is passed over a tape reader head, which includes a row of photo-diodes, one for each of the tape channels designated 15 and one for the sprocket holes designated 14. Each time that a hole passes over a photo-diode, the latter generates an electrical signal which is amplified and fed to a "read-in synchronizer circuit." In the standard arrangement (example: the "Dynapath No. 20 Numerical Control Unit" manufactured by Bendix Corporation, Industrial Controls Division), the signal generated by the sprocket-hole diode 14 is amplified by a conventional channel amplifier 17 and enables the circuit of the synchronizer 16 to read a line of information from the tape 10. That is, an actuating signal must be generated by the sprocket diode 14 in order for the synchronizer to sample, or "read," the outputs from the information-channel diodes.

It will be apparent that systems of the kind described cannot tolerate much variation in the position of the holes punched in the control tape. Unfortunately, appreciable variation in hole alignment can occur, resulting in rejection of workpieces, damaged workpieces, and damaged machines.

Lateral displacement of tape holes is difficult to detect visually, particularly if the trouble causing the displacement is of a random nature. It is not uncommon for a part of a single tape to be punched satisfactorily, while other parts are punched in a manner resulting in erratic operation of the machine being controlled. Erratic operation can, of course, have various other causes, and much time and effort can be expended on trouble-shooting a complex control system when the tape actually is at fault. Time also may be expended on determining whether there are errors in the program punched on the tape.

Various other kinds of sprocket-hole misalignment can cause operational errors of the kind mentioned above. For example, the tape-punching dies can become worn to the extent that the sprocket holes will be displaced longitudinally from the position where they register properly with a sprocket-hole diode. Another form of sprocket-hole misalignment occurs during tape reading if the punched tape is not properly oriented with respect to the tape reader head. For instance, improper orientation results if the punched tape yaws while traveling over the head or if the tape reader head is cocked.

Moderate displacement of the sprocket holes can be compensated for to some extent by increasing the sensitivity of the sprocket-hole diode. This is not a very satisfactory solution because it involves tedious, manual adjustment. Furthermore, the increased sensitivity itself causes problems if some of the sprocket holes are close to the design position, because these holes will cause the diode to conduct so heavily that it may fail to turn off between sprocket holes.

Applicant's improved system is a simple and inexpensive improvement of the system of FIG. 2, and permits accurate reading of the punched tape 10 despite appreciable misalignment of the holes.

Referring to FIG. 3, the improved circuit is similar to that of FIG. 2 in that the output leads from the various information-channel diode amplifiers 17′ are connected into the "read-in synchronizer" 16. However, these output leads also are connected individually to a specially provided, standard OR gate 11′. The output lead 12′ of each gate is connected to the input of a specially provided, standard adjustable time-delay circuit 13′. As indicated, the output lead of time-delay circuit is connected to the actuating-signal terminal of the "read-in synchronizer" 16′. The improved circuit does not utilize the above-mentioned sprocket hole 9.

The circuit of FIG. 3 operates as follows. As the punched tape 10 passes over the tape reader head, whichever information-channel hole is leading exposes its photo-diode 15′ and generates a signal which is impressed on the gate 11′. The gate 11′ passes this signal into the time-delay circuit 13′, which stores the signal for a preselected period (e.g., several hundred microseconds). At the end of this period, the circuit 12′ impresses a signal on the actuating-signal terminal of the synchronizer 16′. The synchronizer 16′ responds in the usual manner by sampling the outputs of the amplifiers 17', 17' for the various channels.

Preferably, the above-mentioned time delay is preselected so that the synchronizer samples the information-channel outputs at a time when the leading information-channel hole is *centered* over its photo-diode.

The reliability of applicant's control circuit is much improved with regard to developing an actuating signal for each line of information, despite misalignment of the tape, the tape holes, or the tape reader head. This is because the actuating signal is developed by the information-channel holes, which are appreciably larger than the sprocket hole. As mentioned previously, the standard circuit becomes unreliable if the sprocket hole misalignment exceeds about 0.005". The typical tape, which is obtained commercially and then punched, has information-channel holes whose diameter exceeds that of the sprocket hole by about 0.025". Thus, the improved circuit is much more reliable.

By delaying the sampling of the information channels until the leading hole has centered over its diode, the improved circuit reduces the possibility of the other information-channel diodes not "seeing" their associated holes. That is, the diodes are more likely to be exposed if the sampling is delayed until light has passed through the wide portions of the holes. This provision guards against the loss of a line of information punched on the tape. As mentioned, missing a line may have a catastrophic effect on the machine or the workpiece, as well as causing all succeeding movements of the machine to be in error.

Delaying the sampling operation as described also makes it more likely that the "sensitive spot" on each diode will be exposed to light. The typical diode has a small, highly sensitive area which can be located only by test.

Having thus described my invention, I claim:

1. A tape reading circuit for sprocket driven punched tapes having sets of laterally aligned information openings therein aligned with said sprocket holes, comprising:
  a plurality of photodiodes positioned in alignment with a set of information openings so as to be activated by light passing through openings in said tape as said tape is moved over said diodes;
  an OR gate having a plurality of inputs and an output;
  a time delay circuit connected to the output of said OR gate for delaying an input signal for a predetermined fixed time equal to the time required for a leading information opening of one of said sets to travel half the distance over a sensitive area of the corresponding photodiode;
  a read-in synchronizer having a plurality of input terminals and an actuating signal input terminal connected to the output of said time delay circuit; and
  means for coupling the outputs of said diodes to respective inputs of said OR gate and said read-in synchronizer so that upon activation of said read-in synchronizer by a delayed signal corresponding to a leading one of the openings of said set all of the outputs of said diodes are sampled simultaneously.

References Cited

UNITED STATES PATENTS 3,122,237 2/1964 Stenstrom.

RALPH G. NILSON, Primary Examiner

T. N. GRIGSBY, Assistant Examiner

U.S. Cl. X.R.

250—209